United States Patent [19]

Trinkwalder

[11] 4,335,734
[45] Jun. 22, 1982

[54] FLOAT WARNING DEVICE

[75] Inventor: Joseph C. Trinkwalder, North Tonawanda, N.Y.

[73] Assignee: Sherwood-Selpac Corp., Lockport, N.Y.

[21] Appl. No.: 14,932

[22] Filed: Feb. 26, 1979

[51] Int. Cl.³ ............... F16K 17/40; F16K 31/18; F16K 33/00
[52] U.S. Cl. .................. 137/77; 137/390; 137/429; 251/245; 251/251; 251/77
[58] Field of Search ........... 137/390, 410, 426, 430, 137/445, 75, 77, 399, 398, 429; 251/77, 234, 251, 245, 246

[56] References Cited

U.S. PATENT DOCUMENTS

| | | | |
|---|---|---|---|
| 27,801 | 4/1860 | Higginbotham | 251/251 |
| 865,568 | 9/1907 | Cooper | 251/251 |
| 1,151,900 | 8/1915 | Norris | 137/399 |
| 1,167,959 | 1/1916 | Wiechert | 251/251 |
| 1,235,825 | 8/1917 | McCrabb | 137/399 |
| 1,336,288 | 4/1920 | Elliott | 137/390 |
| 1,357,988 | 11/1920 | Jerdone, Jr. | 137/399 |
| 1,432,103 | 10/1922 | Feller | 137/390 |
| 1,675,270 | 6/1928 | Hurst | 137/430 |
| 1,719,837 | 7/1929 | Frisbie | 137/390 |
| 2,022,430 | 11/1935 | Nold | 137/390 |
| 2,379,532 | 7/1945 | Lloyd | 251/251 |
| 2,450,308 | 9/1948 | Smith | 251/251 |
| 2,926,685 | 3/1960 | Schmaus | 251/77 |
| 2,956,574 | 10/1960 | Cowan | 137/77 |
| 2,962,042 | 11/1960 | Snider | 137/399 |
| 3,096,966 | 7/1963 | McFarland, Jr. | 251/251 |
| 3,126,907 | 3/1964 | Tischler et al. | 137/399 |
| 3,203,444 | 8/1965 | Gravert | 137/390 |
| 3,351,083 | 11/1967 | Sait | 137/399 |
| 3,945,057 | 3/1976 | Therkelsen | 137/390 |
| 4,004,601 | 1/1977 | Bachelder et al. | 137/77 |
| 4,079,748 | 3/1978 | Masuda | 251/251 |
| 4,126,294 | 11/1978 | DeFrees | 251/251 |

Primary Examiner—George L. Walton
Attorney, Agent, or Firm—Christel, Bean & Linihan

[57] ABSTRACT

A valve for use with a liquid comprising: a valve casing having an inlet and outlet; a valve seat arranged between the inlet and outlet; a plug adapted to be received on the valve seat; sensor means adapted to sense the level of the liquid, the sensor means being operatively associated with the plug so as to vary the position of the plug relative to the valve seat as a function of the level of the liquid; and a lever adapted to vary the position of the plug relative to the valve seat independently of the sensor means.

A valve, for use with a liquid, comprising: a valve casing having an inlet and outlet; a valve seat arranged between the inlet and outlet; a plug adapted to be received on the valve seat; and a lever adapted to vary the position of the plug relative to the valve seat by means of a stem attached to the lever. The lever is attached to the stem by means of a pin attached to the lever, the pin being fitted within a fusible bushing fitted within a hold in the stem. The bushing and pin are arranged such that when the bushing is melted as a result of exposure to elevated temperature, the plug is automatically seated on the valve seat as a result of pressure exerted by the stem on the plug.

22 Claims, 4 Drawing Figures

U.S. Patent    Jun. 22, 1982    4,335,734
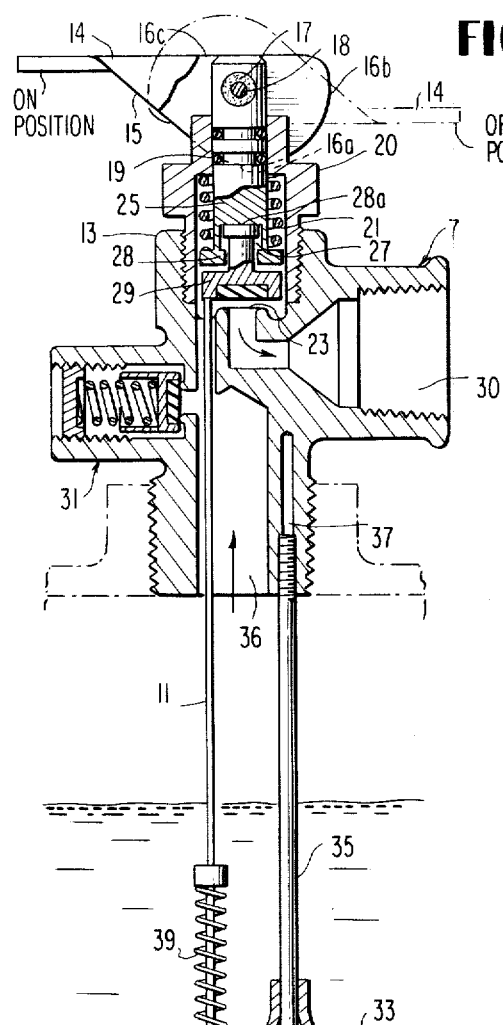
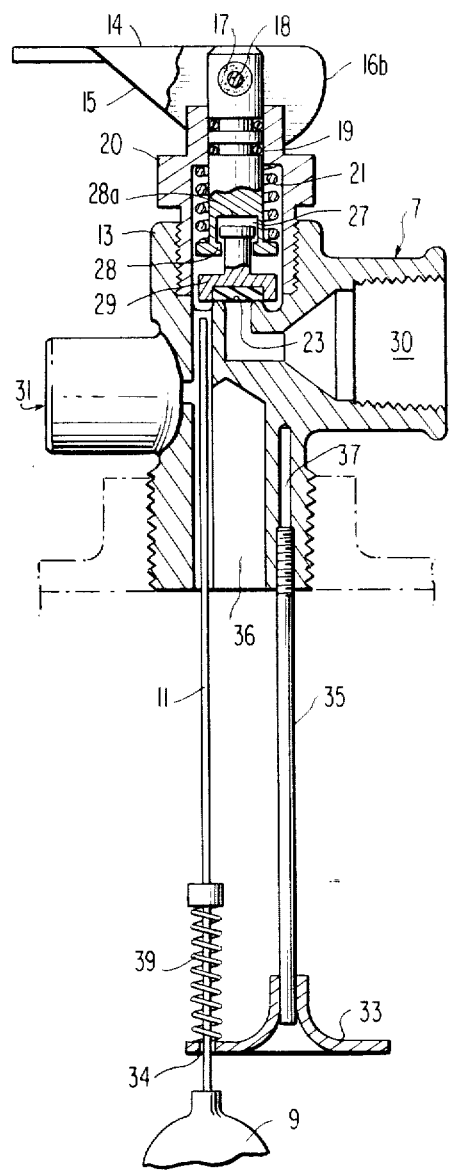
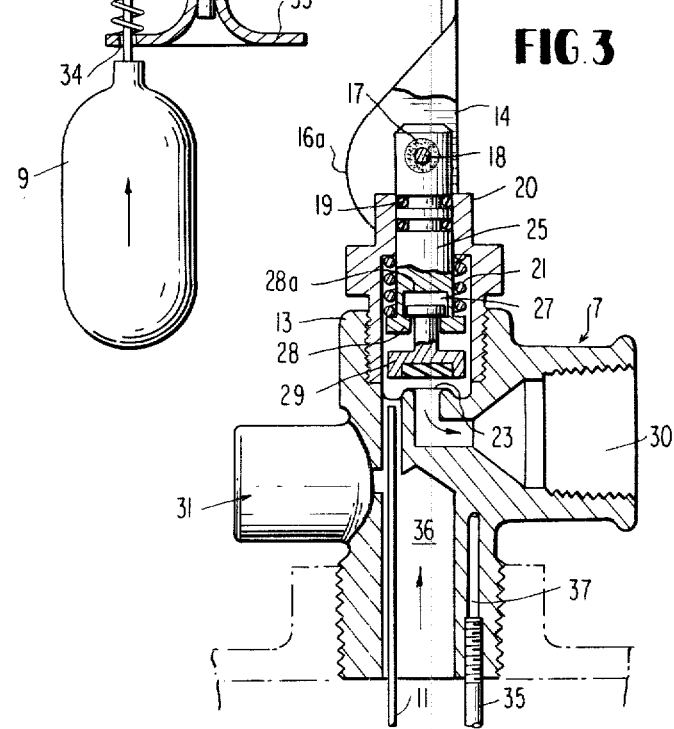
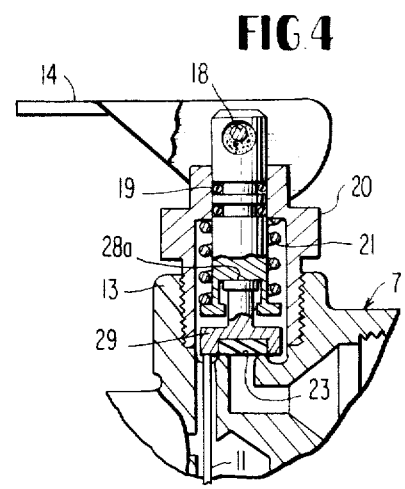

FLOAT WARNING DEVICE

BACKGROUND OF THE INVENTION

1. Field of the Invention

The invention relates to a valve which may or may not comprise a liquid level sensor.

2. Description of the Prior Art

U.S. Pat. No. 1,732,107 to Morgan et. al. discloses a valve for an oil distribution system. As shown, the valve comprises a plug 16' which seats in response to a rising level of liquid within the system. The seating mechanism involves an apertured plate 22 which slides horizontally in response to the level of the float.

U.S. Pat. No. 1,904,793 to Lavoie comprises an outlet control in which an emergency reserve of liquid is maintained by virtue of the level of the liquid outlet formed by cylindrical wall 8. To release the liquid reserve, a knob 26 is pulled which results in the liquid reserve being placed in communication with the liquid outlet through valve 11.

U.S. Pat. No. 1,719,837 illustrates a carburetor feed control arrangement having a liquid level sensor float 2. As the liquid level drops, the float is lowered, thus closing off the liquid feed. A button 11 is provided for prematurely shutting off liquid flow by closing the feed.

U.S. Pat. No. 2,066,315 to Bauer et. al. illustrates a feed tank mechanism with a float controller 34 which releases rotatably mounted member 24 thus permitted valve 14 to seat.

U.S. Pat. No. 2,277,837 to Auld et. al. discloses a switching valve having a float which rises and diverts liquid from flowing into a tank. As the float rises, gasket 41 seats itself, thus blocking liquid flow.

U.S. Pat. No. 2,956,574 to Cowan discloses a fusible valve wherein a thin fusible film acts as a bond between two tapered or conical members. In reviewing the state of the art, the patent states that some devices have used fusible washers or sleeves.

Finally, U.S. Pat. No. 4,004,601 to Bachelder et. al. discloses a valve arrangment wherein a heat fusible material maintains the valve in its open position until it is melted when the valve automatically shuts off.

SUMMARY OF THE INVENTION

It is, therefore, an object of the invention to provide a valve having a liquid level sensor.

It is a further object of the invention to provide a valve having a liquid level sensor which comprises a 3-position lever, including a position corresponding to "reserve".

It is yet another object of the invention to provide a valve comprising a fusible bushing which automatically closes the valve in the event of a fire.

These and other objects are fulfilled by means of the valve of the invention, for use with a liquid, comprising: valve casing having an inlet and outlet; a valve seat arranged between the inlet and outlet; a plug adapted to be received on the valve seat; sensor means adapted to sense the level of the liquid, the sensor means operatively associated with the plug so as to vary the position of the plug relative to the valve seat as a function of the level of the liquid; and a lever adapted to vary the position of the plug relative to the valve seat independently of the sensor means.

The objects of the invention are further fulfilled by means of a valve comprising: a valve casing having an inlet and outlet; a valve seat arranged between the inlet and outlet; a plug adapted to be received on the valve seat; and a lever adapted to vary the position of the plug relative to the valve seat by means of a stem attached to the lever. The lever is attached to the stem by means of pin attached to the lever. The pin is fitted within a fusible bushing fitted within a hole into the stem and the bushing is adapted such that when it is melted as a result of exposure to elevated temperature, the plug is automatically seated on the valve seat as a result of pressure exerted by the stem on the plug.

BRIEF DESCRIPTION OF DRAWINGS

FIG. 1 illustrates a partial cross-sectional view of the valve of the invention in the open position;

FIG. 2 illustrates the valve of FIG. 1 with its plug seated as a result of low liquid level; the plug falls in response to a lowered liquid level by means of a pressure drop across the valve seat by virtue of the fact that the valve is an upstream type valve.

FIG. 3 illustrates the valve when set to release the liquid reserve; and

FIG. 4 illustrates the valve of the invention, its plug seated as a result of its fusible bushing being melted.

DESCRIPTION OF PREFERRED EMBODIMENTS

The valve of the invention comprises a cam-type control level with a pressure-responsive plug opening connected to a float mechanism. The valve is preferably used in connection with a liquid propane system as a means for controlling the flow of propane gas out of a container as a function of the level of liquid propane within the container. As the level of liquid propane drops, as a result of evaporation through the valve, a sensor means serves to block off the valve seat of the valve to prevent further gas flow once a given level of propane liquid has been reached.

The lever of the invention by virtue of its unique construction provides for release of a reserve quantity of propane gas as a result of being rotated to the reserve position. This indicates to the user that the level of propane, or other liquid, is low and must be replenished. After the liquid within the container has been further exhausted, the sensor means serves to completely shut off flow by blocking the valve seat to prevent further gas flow.

The lever used may be connected to the valve casing by means of a fusible bushing which serves to melt when heated, as a result of fire, for example, thus adding a measure of security to the system when used in conjunction with flammable and explosive liquids.

With reference to FIG. 1, the valve of the invention is seen to comprise a valve casing 7 attached to a float 9, serving as a sensor means, by means of a push rod 11. The float is arranged such that it is beneath the liquid level within the storage container and is secured by means of a float support 33.

The valve casing itself comprises a conventional relief valve 31 such that pressure within the container is maintained within desired limits. For example, when operating with liquid propane a pressure of approximately 100 psi should be maintained within the container. As the liquid within the container evaporates it flows upwardly through passage 36 around valve seat 23 and out of the outlet 30. The valve casing is provided with a plug 29 having a flange with a generally "T"-shaped cross-section 28A. The plug is adapted to seat upon valve seat 23 and cooperate therewith to block gas flow out of the valve when desired.

The plug 29 is aligned with respect to push rod 11 such that as the push rod is raised and lowered by float 9, the plug is unseated and may then be reseated on valve seat 23. Push rod 11 is connected to float 9 passes through an orifice 34 in float support 33. A spring 39 is provided around the push rod adjacent to the float support. Spring 39 serves to upwardly bias the float such that an elevated liquid level is necessary to raise the float thus unseating plug 29. Float support 33 is itself connected to the valve casing by means of a float support rod 35 inserted within a bore 37 in the valve casing.

The valve casing additionally comprises a stem 25 which ends in a "U"-shaped cut-out 27 fitted around the "T"-shaped flange of the plug 29. The plug comprises a rubber or similar section adapted to seat on the valve seat. The stem is fitted within neck portion 20 of the valve casing and is surrounded by a spring 21. At the bottom of the stem, perpendicularly directed elements 28 are provided which serve to lift the plug in response to pressure exerted on the stem by means of the lever 14. The spring 21 serves to downwardly bias the stem thus maintaining the cam-shaped surface of the lever 14 against the top shoulder of the neck portion 20 of the valve.

The lever itself is connected to the stem by means of a pin 18 fitted within a fusible bushing 17 itself inserted within an orifice in the stem. The stem is sealingly held within the valve casing by means of sealing washers 19.

The lever, as shown, comprises an oblique portion 15 as well as first, second, and third equilibrium positions 16A, 16B, and 16C respectively.

In operation, the valve is normally maintained in the closed or off position shown in dashed lines in FIG. 1. When pressurized gas is to be released, the valve 14 is rotated by 180 degrees to the position shown in FIG. 1. In this position, surface 16A serves to maintain the stem in its elevated position thus freeing the valve seat for gas flow therethrough. When the container is filled with sufficient liquid, the float will serve to push the push rod upwardly against the plug 29 which would be free to move within the "U"-shaped cut-out of the stem.

As the liquid level drops, the float will reach a level where it no longer serves to support the plug 29 and this plug seats on the valve seat, thus blocking flow. The user is thus alerted to the fact that the liquid level is low and must be replenished. It should be noted that a clearance may be provided between the base of the plug and the surrounding inner wall of the casing. This clearance permits gas to circumvent the plug once it has been seated on the valve seat. The gas then acts to further push down on plug 29 providing a more perfect seal.

After noting that there is no flow in the system, the user need only rotate the lever by 90 degrees as shown in FIG. 3 such that position 16B of the lever is in contact with the upper shoulder of the neck portion 20 of the valve casing. This serves to further raise the stem thus lifting the plug 29 by means of the perpendicularly directed elements 28 gripping the "T"-shaped flange of the plug. Gas is thus free to flow.

FIG. 4 illustrates a situation in which a flame or the like serves to melt the fusible bushing 17 thus resulting in stem 25 moving downwardly, as a result of the bias of spring 21, thus forcing the plug 29 over the valve seat blocking further gas flow. The fusible bushing may be made of any appropriate material and preferably melts at a temperature of about 165 degrees F. As shown in FIG. 4, as the bushing melts, the spring 21 forces the plug over the valve seat thus preventing further flow. The fusible bushing may for example be made out of a lead alloy or the like.

Although the invention has been described with respect to particular elements and materials, it is to be understood that the invention is not limited to the particular elements disclosed and is to be construed as limited only by the claims.

What is claimed is:

1. A valve adapted for connection to a container holding an evaporative liquid for controlling the flow of gas from an outlet of the container spaced from the liquid to allow flow of gas therethrough, said valve comprising:

(a) a valve casing having an inlet adapted to be connected to said container outlet and having an outlet;

(b) a valve seat arranged between said inlet and outlet;

(c) a plug adapted to be received on said valve seat;

(d) a gas conducting passage between said inlet and said valve seat;

(e) sensor means adapted to sense the level of said liquid, said sensor means comprising a float operatively associated with said liquid and an operator element extending from said float and operatively associated with said plug so as to space said plug away from said valve seat thereby placing said inlet and outlet in fluid communication when said liquid is above a predetermined level in said container and so as to allow said plug to move toward said valve seat to be received thereon in response to the level of said liquid falling in said container to cause said plug to block fluid communication between said inlet and outlet when said liquid falls to a predetermined level in said container whereby said valve operates automatically in response to said liquid falling to said predetermined level to shut off the flow of gas to provide an indication to the user that the level of liquid in the container is low and must be replenished, said operator element extending through said inlet and said gas conducting passage during the opening and closing positions of said plug;

(f) a movable lever extending from said valve casing; and (g) means for connecting said lever to said plug independent of said operator element and in a manner such that said plug is moved into and out of seating engagement with said valve seat and may be maintained in or out of such seating engagement in response to movement of said lever independent of operation of said sensor means, said valve remaining operative when said plug is moved and maintained out of seating engagement with said valve seat thereby allowing the user to release a reserve quantity of gas from said container by moving said lever independent of said automatic operation.

2. The valve as defined by claim 1, further comprising a stem attached to said lever, said stem being adapted to vary the position of said plug relative to said valve seat.

3. The valve as defined by claim 2, wherein said plug comprises a "T"-shaped flange.

4. The valve as defined by claim 3, wherein said stem comprises a "U"-shaped cut-out and said flange of said plug is fitted within said cutout such that said plug may be raised by said stem.

5. The valve as defined by claim 4, wherein said valve casing comprises a neck portion and said stem is arranged within said neck portion and protrudes atop said neck portion for attachment to said lever.

6. The valve as defined by claim 5, wherein said lever is pivotably attached to said stem and said lever has a cam surface, said surface being held against said neck portion by means of a spring arranged within said casing.

7. The valve as defined by claim 6, wherein said cam surface comprises first, second and third equilibrium positions, said positions being arranged such that:
 (a) when said lever is pivoted such that said first position bears against said neck portion, said plug is free to move with respect to said valve seat so as to open and close said valve in response to said sensor;
 (b) when said lever is pivoted such that said second position bears against said neck portion, said plug is in a raised position relative to said valve seat such that said valve is open; and
 (c) when said lever is pivoted such that said third position bears against said neck portion, said plug is in a lowered position relative to said valve seat such that said valve is closed.

8. The valve as defined by claim 7, wherein said lever is attached to said stem by means of a pin attached to said lever, said pin being fitted within a fusible bushing fitted within a hole in said stem and being adapted such that when said first or second positions of said lever bear against said neck portion and said fusible bushing is melted as a result of exposure to elevated temperature, said plug is automatically seated in said valve seat as a result of pressure exerted by said stem on said plug.

9. The valve as defined by claim 8, wherein said fusible bushing is adapted to melt at about 165 degrees F.

10. The valve as defined by claim 9, wherein said sensor means is a float.

11. The valve as defined by claim 2, wherein said valve casing comprises a neck portion and said stem is arranged within said neck portion and protrudes atop said neck portion for attachment to said lever.

12. The valve as defined by claim 11, wherein said lever is pivotably attached to said stem and said lever has a cam surface, said surface being held against said neck portion by means of a spring arranged within said casing.

13. The valve as defined by claim 12, wherein said cam surface comprises first, second and third equilibrium positions, said positions being arranged such that:
 (a) when said lever is pivoted such that said first position bears against said neck portion, said plug is free to move with respect to said valve seat so as to open and close said valve in response to said sensor;
 (b) when said lever is pivoted such that said second position bears against said neck portion, said plug is in a raised position relative to said valve seat such that said valve is open; and
 (c) when said lever is pivoted such that said third position bears against said neck portion, said plug is in a lowered position relative to said valve seat such that said valve is closed.

14. The valve as defined by claim 13, wherein said lever is attached to said stem by means of a pin attached to said lever, said pin being fitted within a fusible bushing fitted within a hole in said stem and being adapted such that when said first or second positions of said lever bear against said neck portion and said fusible bushing is melted as a result of exposure to elevated temperature, said plug is automatically seated in said valve seat as a result of pressure exerted by said stem on said plug.

15. The valve as defined by claim 2, wherein said lever is attached to said stem by means of a pin attached to said lever, said pin being fitted within a fusible bushing fitted within a hole in said stem, and adapted such that when said bushing is melted as a result of exposure to elevated temperature said plug is automatically seated in said valve seat as a result of pressure exerted by said stem on said plug.

16. The valve as defined by claim 15, wherein said fusible bushing is adapted to melt at 165 degrees F.

17. The valve as defined by claim 1 further including supporting means extending from said valve casing and operatively associated with said float for holding said float in said liquid in a manner such that as said liquid level moves in said container the direction of movement of said float is generally parallel to the direction of movement of said plug toward and away from said valve seat and said operator element extends from said float in a direction generally parallel to said direction of movement of said float and said valve seat.

18. The valve as defined by claim 17 further including biasing means operatively associated with said supporting means and said float for urging said float in a direction toward said liquid level such that an elevated liquid level in said container is necessary to space said plug away from said valve seat.

19. A valve adapted for connection to a container holding an evaporative liquid for controlling the flow of gas from the container, said valve comprising:
 (a) a valve casing having an inlet adapted to be connected to said container and an outlet;
 (b) a valve seat arranged between said inlet and outlet;
 (c) a plug adapted to be received on said valve seat;
 (d) a gas conducting passage between said inlet and said valve seat;
 (e) sensor means adapted to sense the level of said liquid, said sensor means comprising a float operatively associated with said liquid and an operator element extending from said float and operatively associated with said plug so as to space said plug away from said valve seat thereby placing said inlet and outlet in fluid communication when said liquid is above a predetermined level in said container and so as to allow said plug to move toward said valve seat to be received thereon in response to the level of said liquid falling in said container to cause said plug to block fluid communication between said inlet and outlet when said liquid falls to a predetermined level in said container whereby said valve operates automatically in response to said liquid falling to said predetermined level to shut off the flow of gas to provide an indication to the user that the level of liquid in the container is low and must be replenished;
 (f) said operator element extending through said inlet and said gas conducting passage during the opening and closing positions of said plug said operator element engaging and spacing said plug away from said valve seat in response to said liquid being above said predetermined level and remaining engaged with said plug as the liquid level falls toward said predetermined level, said operator element disengaging from said plug in response to said liquid falling below said predetermined level to rest said plug on said valve seat and block fluid communication between said inlet and said outlet;

(g) a movable lever extending from said valve casing; and (h) means for connecting said lever to said plug in a manner such that said plug is moved into and out of seating engagement with said valve seat and may be maintained in or out of such seating engagement in response to movement of said lever independent of operation of said sensor means, said valve remaining operative when said plug is moved and maintained out of seating engagement with said valve seat thereby allowing the user to release a reserve quantity of gas from said container by moving said lever independent of said automatic operation.

20. The valve as defined in claim 19, wherein said means for connecting said lever to said plug comprises a stem operatively engaging said plug at one end thereof and extending through an opening in said casing, said lever being pivotally attached to said stem near the other end thereof, and wherein said lever has a cam surface held against a surface of said casing near said stem by biasing means, said cam surface comprising first, second and third equilibrium positions arranged such that:

(a) when said lever is pivoted such that said first position bears against said casing surface, said plug is free to move with respect to said valve seat so as to open and close said valve in response to said sensor;

(b) when said lever is pivoted such that said second position bears against said casing surface, said plug is in a raised position relative to said valve seat such that said valve is open; and (c) when said lever is pivoted such that said third position bears against said casing surface, said plug is in a lowered position relative to said valve seat such that said valve is closed.

21. A valve adapted for connection to a container holding an evaporative liquid for controlling the flow of gas from the container, said valve comprising:

(a) a valve casing having an inlet adapted to be connected to said container and an outlet;

(b) a valve seat arranged between said inlet and outlet;

(c) a plug adapted to be received on said valve seat;

(d) a gas conducting passage between said inlet and said valve seat;

(e) sensor means adapted to sense the level of said liquid, said sensor means comprising a float operatively associated with said liquid and an operator element extending from said float and operatively associated with said plug so as to space said plug away from said valve seat thereby placing said inlet and outlet in fluid communication when said liquid is above a predetermined level in said container and so as to allow said plug to move toward said valve seat to be received thereon in response to the level of said liquid falling in said container to cause said plug to block fluid communication between said inlet and outlet when said liquid falls to a predetermined level in said container whereby said valve operates automatically in response to said liquid falling to said predetermined level to shut off the flow of gas to provide an indication to the user that the level of liquid in the container is low and must be replenished;

(f) said float being in said container and said operator member extending through said inlet and said gas conducting passage during the opening and closing positions of said plug;

(g) a movable lever extending from said valve casing; and (h) means for connecting said lever to said plug in a manner such that said plug is moved into and out of seating engagement with said valve seat and may be maintained in or out of such seating engagement in response to movement of said lever independent of operation of said sensor means, said valve remaining operative when said plug is moved and maintained out of seating engagement with said valve seat thereby allowing the user to release a reserve quantity of gas from said container by moving said lever independent of said automatic operation.

22. The valve as defined in claim 21, wherein said means for connecting said lever to said plug comprises a stem operatively engaging said plug at one end thereof and extending through an opening in said casing, said lever being pivotally attached to said stem near the other end thereof, and wherein said lever has a cam surface held against a surface of said casing near said stem by biasing means, said cam surface comprising first, second and third equilibrium positions arranged such that:

(a) when said lever is pivoted such that said first position bears against said casing surface, said plug is free to move with respect to said valve seat so as to open and close said valve in response to said sensor;

(b) when said lever is pivoted such that said second position bears against said casing surface, said plug is in a raised position relative to said valve seat such that said valve is open; and (c) when said lever is pivoted such that said third position bears against said casing surface, said plug is in a lowered position relative to said valve seat such that said valve is closed.

* * * * *